(12) United States Patent
Bruce et al.

(10) Patent No.: US 6,722,377 B1
(45) Date of Patent: Apr. 20, 2004

(54) PROCESS FOR CLEANING REACTORS

(75) Inventors: Spencer Wayne Bruce, Algonquin, IL (US); James Kent Carpenter, Lambertville, NJ (US); Jeanine Lee Hurry, North Wales, PA (US); Joseph Richard Povernick, Philadelphia, PA (US); Frank Randolph Robertson, III, Pearland, TX (US); Robert Hugh Schwartz, Parkland, PA (US); Richard Shu-Hua Wu, Fort Washington, PA (US)

(73) Assignee: Rohm and Haas Company, Philadelphia, PA (US)

( * ) Notice: Subject to any disclaimer, the term of this patent is extended or adjusted under 35 U.S.C. 154(b) by 172 days.

(21) Appl. No.: 09/641,155

(22) Filed: Aug. 17, 2000

Related U.S. Application Data

(60) Provisional application No. 60/150,989, filed on Aug. 27, 1999.

(51) Int. Cl.$^7$ .................................................. B08B 3/02
(52) U.S. Cl. ...................... 134/22.17; 134/3; 134/22.19
(58) Field of Search ........................ 134/2, 22.1, 22.17, 134/22.18, 24, 35, 38, 40, 22.19; 510/188

(56) References Cited

U.S. PATENT DOCUMENTS

| | | | | |
|---|---|---|---|---|
| 3,865,628 A | * | 2/1975 | Callahan et al. ................ | 134/2 |
| 3,985,572 A | * | 10/1976 | Petermann et al. ..... | 134/167 R |
| 3,997,360 A | * | 12/1976 | Testa et al. ............... | 134/22.19 |
| 4,018,623 A | * | 4/1977 | Walker ......................... | 134/21 |
| 4,591,391 A | * | 5/1986 | Shimizu et al. ........... | 134/22.17 |
| 4,731,126 A | * | 3/1988 | Dixit et al. .................... | 134/19 |
| 4,863,524 A | * | 9/1989 | Komabashiri et al. ... | 134/22.19 |
| 5,145,597 A | * | 9/1992 | Rodriguez et al. .......... | 252/181 |
| 5,728,272 A | | 3/1998 | Hammon et al. ............... | 203/8 |
| 5,762,718 A | * | 6/1998 | Linstid et al. ............ | 134/22.18 |
| 5,782,989 A | | 7/1998 | Rueter ...................... | 134/22.19 |
| 2003/0073595 A1 | * | 4/2003 | Dorton et al. .............. | 510/188 |

FOREIGN PATENT DOCUMENTS

| | | |
|---|---|---|
| DE | 33 25 166 A1 | 1/1995 |
| EP | 0 248 681 B1 | 12/1992 |

OTHER PUBLICATIONS

CAPLUS 1974:464592, "Removal of Polymer Deposit From Equipment", Nishikawa, Tokutomi; Masuda, Toshihiko, Jan. 25, 1974.

* cited by examiner

*Primary Examiner*—Frankie L. Stinson
*Assistant Examiner*—Joseph L. Perrin
(74) *Attorney, Agent, or Firm*—Ronald D. Bakule

(57) ABSTRACT

This invention relates to a process for cleaning reactors. The process utilizes a solvent fed from multiple pressure sources to clean reactors of residual polymers. The reactors are equipped with agitators and stationary nozzles aimed at the agitator blades. The agitator is rotated during cleaning. The process may also utilize heated aqueous base to clean heat exchangers in external loops. In one aspect, a mixture of at least one organic solvent and aqueous base are utilized to clean certain reactors.

1 Claim, No Drawings

PROCESS FOR CLEANING REACTORS

This application claims benefit of Provisional No. 60/150,989 filed Aug. 27, 1999.

This invention relates to a process for cleaning reactors. In particular, the invention relates to a process which utilizes a solvent fed from multiple pressure sources to clean reactors of residual polymers. The process may also utilize heated aqueous base to clean heat exchangers in external loops. In one aspect, a mixture of at least one organic solvent and aqueous base are utilized to clean reactors.

Polymers may be made by various processes, which include solution, bulk, and emulsion polymerization. The process may be a batch process in which all materials to be reacted are premixed and fed to a reactor where they are polymerized. Alternatively, the process may be a continuous process where the materials to be polymerized are continuously fed to a reactor while polymer is continuously removed from the reactor.

Polymerizations tend to be exothermic reactions. In order for the polymerization to be controlled properly and safely, the reactors are generally cooled. Frequently, the polymer is cooled through passing a coolant such as water or brine through a jacketed reactor. Some reactors utilize external heat exchangers in an external loop (a pipe which removes the polymer from the reactor, carries the polymer to the heat exchanger, and returns the cooled polymer to the reactor) to aid in cooling the polymer.

Regardless of the process utilized to polymerize and control temperature, most polymerizations result in the build up of residual polymer inside the reactor and pipes to and from the reactor.

One reactor generally will be utilized to make more than one type of polymer. Therefore, reactors are typically cleaned either after each batch of polymer made, or when residual polymer builds up to an unacceptable level. The amount of time it takes to clean a reactor is important because no products can be made in the reactor during cleaning. Therefore, there is a need for a process for cleaning reactors, wherein the amount of time it takes to clean the reactor is reduced.

An approach to cleaning monomer distillation columns was taught in U.S. Pat. No. 5,728,272. The process disclosed in that patent requires flushing the column intermittently with either aqueous or organic basic solutions. The process prevents excessive build up of polymer in the distillation column, and therefore reduces column cleaning time.

European Patent No. EP 248,681 disclosed a process for cleaning reactors which were used in polymerizations. The process required the use of a soap builder, an alkali agent, a surfactant, and a solvent or monomer. The materials were mixed together in the reactor and stirred to clean the reactor.

French Patent No. 2,189,425 also disclosed a process for cleaning reactors which were used in polymerizations. The process utilized a caustic spray, which was followed by a high pressure water spray.

Despite the disclosure of the references, there is a continuing need for a process for cleaning reactors, wherein the amount of time it takes to clean the reactor is reduced.

The present invention provides a process including: feeding a solution selected from water, and a mixture of caustic and at least one organic solvent through multiple pressure sources to a reactor having an agitator with blades and stationary pressure sources aimed at the agitator blades; and emptying the reactor; wherein the agitator is rotated while the solution is fed to the reactor.

As indicated above, the first step in the process of the invention involves feeding a solution selected from water, and a mixture of caustic and at least one organic solvent through multiple pressure sources to a reactor having an agitator. As used herein, by multiple pressure sources is meant more than one pressure source, preferably two pressure sources.

The pressure sources must be able to deliver the solution at a pressure from 0 bar to 700 bar, preferably from 60 bar to 700 bar, more preferably from 100 bar to 700 bar, most preferably from 300 bar to 700 bar. The pressure may be obtained through means known in the art, such as the use of a pump. Suitable pumps are known in the art and are commercially available.

The temperature of the solution as it is fed through the pressure sources typically ranges from 10° C. to 100° C. When caustic is the solution, the temperature of the solution will range from 80° C. to 100° C. The amount of solution fed will depend on the size of the reactor and the degree of polymer build up on the reactor. Where caustic is the solution, the solution may be recycled.

Suitable organic solvents include, but are not limited to isopropanol, n-propanol, acetone, methanol, ethanol, and 1-methyl 2-pyrrolidinone. Isopropanol and acetone are preferred.

The pressure sources are drawn up out of the reactor when the reactor is not being cleaned, and fed to the reactor when reactor cleaning is necessary. The pressure sources may be located anywhere within the reactor during reactor cleaning. Preferably, the pressure sources are located near the bottom of the reactor, for example within 2 meters of the top of the agitator blade, preferably within 1 meter of the top of the agitator blade during reactor cleaning. Both pressure sources may be at the same distance from the top of the agitator blade, or the pressure sources may be staggered, for example one pressure source may be 5 meters from the top of the agitator blade while the other pressure source may be 1 meter from the top of the agitator blade. It is preferred that both pressure sources be at the same distance from the top of the agitator blade.

As the solution being sprayed from one pressure source may hit another pressure source, the pressure sources must also be able to withstand being sprayed by solutions at the pressures utilized in this invention. The pressure sources may be pipes or hoses. The pipes may be inserted into the reactor through metal tubes known as shrouds. For optimal cleaning performance, the pressure sources may be positioned 180° apart with the agitator shaft separating them. When caustic is utilized, the pressure sources must be resistant to caustic. Suitable materials of construction for the pressure sources include 316 stainless steel.

The pressure sources may be connected to a source of water, or a mixture of caustic and at least one organic solvent by a hose. This hose must be able to withstand being drawn up to remove the pressure source and being extended to place the pressure source within the reactor. Therefore, suitable materials of construction for these hoses include corrugated 316 stainless steel. The corrugated stainless steel may be wrapped in wire mesh. The wire mesh may also be constructed from 316 stainless steel.

The pressure sources may be equipped with nozzles which rotate while spraying the reactor. As above, when caustic is utilized, the nozzles must be resistant to caustic. Suitable nozzles include Sellers Cleaning Systems Gamma Jet® nozzles and the like. Such nozzles may rotate in both the vertical and the horizontal plane.

The agitator is rotated while the solution is being fed to the reactor. The rotation aids in cleaning both the reactor and the agitator. The agitator may be rotated at from 10 rpm to 50 rpm, preferably 10 rpm to 30 rpm.

The reactor is also be equipped with multiple spray nozzles at the bottom of the reactor to aid in cleaning the agitator. It is preferred that the reactor be equipped with three nozzles for this purpose. These nozzles must be stationary and are aimed at the agitator blades. Suitable nozzles include those available through Spray Systems Incorporated and the like.

After the reactor has been cleaned by feeding the solution to it, the reactor may be emptied. If necessary, the reactor may be rinsed with water to remove residual cleaning solutions. If necessary, the rinse water may be a neutralized solution, such as a mixture of carbon dioxide and water to aid in neutralizing any residual caustic.

In one embodiment of the invention, the reactor is equipped with a heat exchanger in an external loop and the heat exchanger and external loop are cleaned with an aqueous base at a temperature of from 20° C. to 150° C., preferably 90° C. to 150° C. As used herein, by aqueous base is meant caustic, ammonium hydroxide, potassium hydroxide and the like. Caustic is preferred. Caustic at a concentration of 10 to 15 percent is more preferred.

The external loop may be a pipe that removes a reaction mixture from the reactor, feeds the reaction mixture to the heat exchanger, and returns the cooled reaction mixture to the reactor. The heat exchanger may be a tubular, plate-fin, plate-frame, or spiral-plate heat exchanger. In the process of the invention, aqueous base is fed through the external loop and heat exchanger at the temperatures described above. The amount of aqueous base fed will depend on the size of the pipes and heat exchanger, but generally may range from 400 liters per minute to 800 liters per minute.

After the external loop and heat exchanger have been cleaned by feeding the solution to it, the external loop and heat exchanger may be emptied. If necessary, the external loop and heat exchanger may be rinsed with water to remove residual cleaning solutions. If necessary, the rinse water may be a neutralized solution, such as a mixture of carbon dioxide and water to aid in neutralizing any residual caustic.

In another embodiment of the invention, the reactor is cleaned by feeding a solution selected from an aqueous base, an organic solvent and combinations thereof to the reactor and emptying the reactor. In this embodiment of the invention, the reactor is preferably selected from a plate-fin, plate-frame, and spiral-plate heat exchanger. A plate-frame heat exchanger is more preferred.

The reactor is cleaned by feeding a solution selected from an aqueous base, an organic solvent, and combinations thereof to the reactor. In this embodiment, sodium hydroxide or potassium hydroxide is the preferred aqueous base. Potassium hydroxide is more preferred. Suitable organic solvents include, but are not limited to isopropanol, n-propanol, methanol, ethanol, n-butanol, t-butanol, and 1-methyl 2-pyrrolidinone. When a single organic solvent is desired as the solution, acetone is preferred. Where a combination of aqueous base and organic solvent are utilized, isopropanol is the preferred organic solvent and the amount of aqueous base in the solution generally ranges from 10 weight percent to 40 weight percent, preferably from 15 weight percent to 30 weight percent, based on the total weight of the solution. The amount of organic solvent in the solution generally ranges from 30 weight percent to 70 weight percent, preferably from 40 weight percent to 60 weight percent, based on the total weight of the solution. The remainder of the solution may be water and impurities.

The temperature at which the solution is fed through the reactor depends on the solution being fed to the reactor. For the combination of aqueous base and organic solvent, the temperature at which it is fed to the reactor typically ranges from 90° C. to 150° C. For the single organic solvent, the temperature at which it is fed to the reactor typically ranges from 20° C. to 45° C., preferably from 30° C. to 40° C.

After the reactor has been cleaned with the solution, the reactor may be emptied and rinsed with water to remove residual cleaning solutions.

Throughout this specification and claims, unless otherwise indicated, references to percentages are by weight percent and all temperatures are in degree centigrade.

It is also to be understood that for purposes of this specification and claims that the range and ratio limits, recited herein, are combinable. For example, if ranges of 1–20 and 5–15 are recited for a particular parameter, it is understood that ranges of 1–15 or 5–20 are also contemplated.

The following examples are intended to illustrate the process of the invention. The examples should not be construed as limiting the scope of the invention.

Example 1

Reactor Cleaning with Water Through a Single Pressure Source

A butyl acrylate/methyl methacrylate polymerization was performed in a 70,000 liter reactor. After the polymerization was completed, the polymer dispersion was drained from the reactor. Water was sprayed through a single 316 stainless steel pressure source equipped with a 3 head nozzle at 24 bar for 10 minutes. The reactor was drained and viewed visually for residual polymer. The reactor was cleaned but residual polymer was noted.

Example 2

Reactor Cleaning with Water Through Multiple Pressure Sources

A second batch of a similar polymer composition of Example 1 was prepared in the reactor used for Example 1. After the polymerization was completed, the polymer dispersion was drained from the reactor. Water was sprayed through two stainless steel pressure sources equipped with 3 head nozzles and 3 stationary nozzles at the bottom of the reactor, aimed at the agitator blade at 24 bar for 10 minutes. The agitator was rotated at 30 rpm while the water was sprayed. The reactor was drained and viewed visually for residual polymer. The reactor was cleaner than when cleaned with one lance.

Example 3

Reactor Cleaning with Caustic Through a Single Pressure Source

A butyl acrylate/methyl methacrylate polymerization was performed in a 70,000 liter reactor. After the polymerization was completed, the polymer dispersion was drained from the reactor. Caustic at 95° C. was sprayed through a single 316 stainless steel pressure source equipped with a 3 head nozzle at 24 bar for 10 minutes. The reactor was drained and viewed visually for residual polymer. The reactor was cleaned but residual polymer was noted.

Example 4

Reactor Cleaning with Caustic Through Multiple Pressure Sources

A second batch of a similar polymer composition of Example 3 was prepared in the reactor used for Example 3.

After the polymerization was completed, the polymer dispersion was drained from the reactor. Caustic at 95° C. was sprayed through two stainless steel pressure sources equipped with 3 head nozzles and 3 stationary nozzles at the bottom of the reactor, aimed at the agitator blade at 24 bar for 10 minutes. The agitator was rotated at 30 rpm while the water was sprayed. The reactor was drained and viewed visually for residual polymer. The reactor was cleaner than when cleaned with one lance.

Example 5

External Loop and Heat Exchanger Cleaning

Coupons of 316 stainless steel (1.9 cm×3.2 cm) were used as test surfaces. These coupons simulated the surfaces of an external loop and heat exchanger. The coupons were "fouled" by painting on AC-630 (Polymer A) or KM-334 (Polymer B) emulsion (latexes commercially available through Rohm and Haas Company) and allowing the emulsion to dry. The coupons were weighed before and after fouling to determine the amount of material on the stainless steel.

The dried coupon was placed in Parr Instruments pressure container ("Parr Bomb") with 15 ml of 15% caustic. An air vapor space was left in the container to prevent any pressure increase from the expanding liquid. The vessel was put in an oven at temperatures of 85° C., 125° C., and 150° C. After a specified time, between 4 and 24 hours, the container was removed and allowed to cool for approximately 45 min. The coupon was removed and allowed to dry.

After drying, the coupon was weighed, and compared to its original, fouled weight.

Polymer A Results

At 85° C., the polymer film was not removed from the coupon after 4 hr and 8 hr in oven. In fact the polymer weight increased, probably from liquid absorption into the fouling layer. At 20 hrs, the weight of the coupon had dropped. The results are reported in Table 1.

TABLE 1

Polymer A Loss in Weight

| Temperature (° C.) | Time | Initial Fouling Weight (gm) | Fouling After Clean (gm) | Percent of Original Polymer |
|---|---|---|---|---|
| 85 | 4 | 0.328 | 0.335 | 102 |
| 85 | 8 | 0.379 | 0.5708 | 150 |
| 85 | 20 | 0.194 | 0.010 | 5.2 |
| 125 | 4 | 0.243 | 0.292 | 160 |
| 125 | 4 | 0.333 | 7E-05 | 0.02 |
| 125 | 8 | 0.236 | 0.241 | 139 |
| 125 | 8 | 0.187 | 0.001 | 0.5 |
| 125 | 18.5 | 0.332 | 0.016 | 4.8 |
| 125 | 18.5 | 0.262 | 0.006 | 3.0 |
| 125 | 18.5 | 0.262 | 0.015 | 6.9 |
| 125 | 20 | 0.172 | 0.026 | 28.5 |
| 150 | 4 | 0.440 | 0.069 | 15.6 |
| 150 | 8 | 0.715 | 0.023 | 3.2 |
| 150 | 23 | 0.424 | 0.007 | 1.7 |

At 125° C., the results for the initial run were similar to the 85° C. experiment. The coupon weight was higher (close to the original, fouled weight) after 4 hr and 8 hr. At this higher temperature, though, the material almost slid off the coupon whereas at 85° C. this was not the case. At 20 hr the coupon was essentially clean.

In repeated runs at 125° C., the polymer slid off the coupon while being removed from the Parr bomb for all times tested. The final weight of the cleaned coupon was very close to the initial weight of the pre-fouled coupon in these experiments.

At 150° C. the coupon was clean of polymer at 4 hr, 8 hr, and 23 hr.

Polymer B Results

The results for Polymer B are reported in Table 2.

TABLE 2

Polymer B Loss in Weight

| Temperature (° C.) | Time | Initial Fouling Weight (gm) | Fouling After Clean (gm) | Percent of Original Polymer (%) |
|---|---|---|---|---|
| 85 | 4 | 1.361 | 1.729 | 127 |
| 85 | 8 | 1.187 | 1.469 | 124 |
| 85 | 22 | 1.501 | 0.024 | 1.6 |
| 125 | 4 | 1.149 | 0.031 | 2.7 |
| 125 | 4 | 0.787 | 0.007 | 0.9 |
| 125 | 4 | 0.321 | 0.031 | 9.6 |
| 125 | 8 | 0.894 | 0.054 | 5.9 |
| 125 | 8 | 0.288 | 0.075 | 26.1 |
| 125* | 15 | 0.717 | −0.058 | −8.0 |
| 125 | 20 | 0.649 | 0.200 | 30.9 |
| 125 | 20 | 0.582 | 0.043 | 7.3 |
| 125 | 23 | 1.402 | 0.341 | 24.3 |
| 150 | 4 | 0.546 | 0.011 | 1.9 |
| 150 | 15 | 0.533 | 0.012 | 2.3 |
| 150 | 16 | 0.581 | 0.017 | 2.8 |

* = Suspect an error was made in the weight readings.

At 85° C. similar results were found with Polymer B as with Polymer A. The weight increased after 4 hr and 8 hr. At 20 hr, the polymer began to break down and the weight of the coupon dropped. At this temperature, Polymer B slid off the coupon, but remained in the caustic as a separate solid phase.

At 125° C., the 4 hr and 8 hr results were different from the 85° C. results, the polymer slid off the coupon and was floating in the caustic solution. After 20 hours, though, there was no polymer in the caustic solution and the caustic changed from a thin, inviscid solution to a yellow/beige liquid with a syrup type viscosity. It is assumed that the hydrolyzed polymer thickened the liquid. When the last (20 hr) sample was removed the thickened solution tended to stick to the coupon. This allowed more liquid to cling to the metal and produced a slightly higher weight coupon than the earlier samples.

At 150° C., the 4 hr sample was similar to the first two 125° C. samples, the coupon was clean, with the polymer floating in the caustic. In the later samples, at 15 hr and 16 hr, the polymer was broken down and the caustic solution was thicker.

Example 6

Plate-frame Reactor Cleaning

A butyl acrylate/methyl methacrylate polymer ("latex"), AC-630, was prepared in a plate and frame heat exchanger reactor. The polymerization was run for three hours under conditions to accelerate fouling. The feed to the reactor consisted of monomer emulsion, water, catalyst and activator at a rate of 25 ml/min. The reactor was a 1 channel×5 pass with a total volume of 125 ml or 25 ml per channel. The reactor was cleaned online with two different solutions:

Solution 1

After the polymerization was completed, the reactor was flushed with soapy water to remove any remaining monomer emulsion. A 21% KOH, 25.5% Water, 53.5% IPOH solution was heated and maintained at 70° C. and pumped into the reactor at a rate of 100–300 g/min. The first 10 minutes of flushing with the cleaning solution was collected, totaling about 1000–1500 grams. The cleaning solution was recirculated in the reactor, changing directions from forward to backward every other hour, for four hours. The reactor sat overnight with the cleaning solution in it. The next day it was opened up and the plates were found to be perfectly clean.

Solution 2

After the polymerization was completed, the reactor was flushed with soapy water to remove any remaining monomer emulsion. Acetone was heated and maintained at 35° C. and pumped into the reactor at a rate of 150–300 g/min. The first 10 minutes of flushing with the cleaning solution was collected, totaling about 1000–1500 grams. The cleaning solution was recirculated in the reactor for two hours. After two hours the reactor was flushed with deionized water and opened up. The reactor was almost clean. There were nine very small pieces (<4 mm in diameter) of polymer in the unit. This is clean enough to avoid opening the reactor after each run.

We claim:

1. A process for cleaning a reactor comprising:

feeding a liquid solution that is a combination of an aqueous base and an organic solvent and comprises from 15 weight percent to 30 weight percent aqueous base and from 40 weight percent to 60 weight percent organic solvent, based on the total weight of the solution, and the remainder water to the reactor; and emptying the reactor; wherein, the reactor is selected from the group consisting of a plate-frame heat exchanger, a plate-fin heat exchanger, and a spiral-plate heat exchanger.

* * * * *